United States Patent Office 3,427,188
Patented Feb. 11, 1969

3,427,188
ZINC-COATED POLYIMIDE PRODUCTS
John Willard Jones, Wilmington, Del., assignor to E. I. du Pont de Nemours and Company, Wilmington, Del., a corporation of Delaware
No Drawing. Filed Sept. 16, 1964, Ser. No. 397,011
U.S. Cl. 117—122                                        5 Claims
Int. Cl. B32b 15/08; C23c

ABSTRACT OF THE DISCLOSURE

A polyimide shaped article having on at least one surface a coating of zinc, said polyimide being characterized by a recurring unit having the following structural formula:

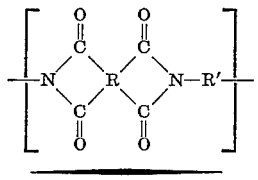

This invention relates to polyimide shaped articles such as films, fibers, blocks, and the like. More particularly, this invention is directed to zinc-coated polyimide shaped articles of outstanding sealing properties.

According to the present invention, a novel polyimide article has been discovered which can readily be joined or fused to itself by the application of heat and/or pressure.

Attempts in the past to make a readily self-sealable polyimide shaped article have involved the use of adhesive but have not been fully satisfactory because no commercially available adhesives have the requisite combination of thermal stability and flexibility for many applications. Other attempts have involved the use of coatings from solvent solutions. It is believed that the present discovery is the first time it has been found that the problem can be solved by use of a metal coating.

The article of this invention comprises a polyimide shaped article coated with a thin layer of zinc. The thickness of the polyimide article is not critical since the zinc layer is a surface coating. The zinc layer will ordinarily be in the range of about 0.01 to 10 mils thick. When the polyimide article is a film, the film will ordinarily be about 0.1 to 10 mils thick.

The zinc coating can be applied to one or more surfaces of the polyimide article without any pretreatment of the polyimide surface. The application method can be any one which is suitable for applying a continuous layer of zinc of the desired thickness. Typical procedures are vacuum metallization, electrodeposition, spraying, rolling, dipping, etc. For very thin layers, such as on the order of 0.01–0.1 mil thick, vacuum metallization has particular advantages and is preferred. Thick coatings can be applied by dipping thinly-coated articles into molten zinc.

The resulting zinc-coated polyimide article can readily be sealed to itself, either heat-sealed or simply pressure-sealed. Surprisingly, such sealing can be carried out quickly and easily without destruction of the metal-to-film bond. When the zinc-coated sides of the structures of this invention are placed together, bonded articles can be obtained by both of these methods on the same structure. If the coated articles have been stored for an appreciable length of time prior to sealing, improved bonds can be obtained if the zinc surface is cleaned just before sealing.

In one important embodiment, the thin zinc coating on the polyimide surface serves as an effective anchoring or bonding layer for application of another metal or metal alloy such as a lead-tin solder to the surface of the zinc.

The polyimide articles and their preparation are known and are described, for example in Edwards U.S. patent application Ser. No. 169,120, filed Jan. 26, 1962, and assigned to the same assignee as that of the present application. The entire disclosure of the Edwards application is hereby incorporated by reference.

As described by Edwards, the polyimides are characterized by a recurring unit having the following structural formula:

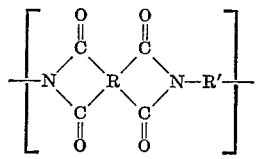

wherein R is a tetravalent radical containing at least six carbon atoms in a ring, said ring characterized by benzenoid unsaturation, the four carbonyl groups being attached to separate carbon atoms and each pair of carbonyl groups being attached to adjacent carbon atoms in the R radical; and wherein R' is a divalent benzenoid radical selected from the group consisting of

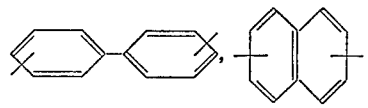

and

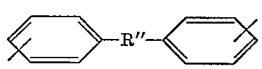

wherein R'' is selected from the group consisting of an alkylene chain having 1–3 carbon atoms,

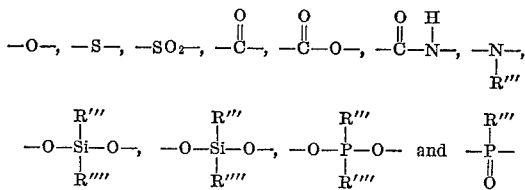

where R''' and R'''' are radicals having 1–6 carbon atoms and each is alkyl or aryl.

The polyimides are prepared by reacting at least one organic diamine having the structural formula $$H_2N-R'-NH_2$$

wherein R' is as defined above with at least one tetracarboxylic acid dianhydride having the structural formula:

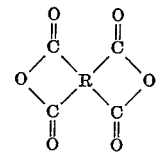

wherein R is a tetravalent organic radical containing at least six carbon atoms characterized by benzenoid unsaturation, the four carbonyl groups being attached to separate carbon atoms and carbon atoms of each pair of carbonyl groups being attached to adjacent carbon atoms in the radical.

Illustrative of diamines within this invention are 4,4'-diamino-diphenyl propane, 4,4'-diamino-diphenyl methane, benzidine, 3,3'-dichloro-benzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4' - diamino - diphenyl ethyl phosphine oxide, 4,4'-diamino-diphenyl phenyl phosphine oxide and 4,4'-diamino-diphenyl N-methyl amine, 4,4'-diamino-diphenyl-N-phenyl amine, 4,4'- diamino benzophenone, 3',4-diaminobenzanilide, 3,4'-diamino phenyl benzoate, and mixtures thereof.

Illustrative of dianhydrides within the present invention are pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis-(3,4-dicarboxyphenyl) sulfone dianhydride, perylene 3,4,9,10-tetracarboxylic acid dianhydride, bis(3,4-dicarboxyphenyl) ether dianhydride, 1,4,5,8-naphthalene tetracarboxylic dianhydride, 3,4,3',4'-benzophenone tetracarboxylic dianhydride, 2,3,2',3'-benzophenone tetracarboxylic dianhydride, 2,3,3',4'-benzophenone tetracarboxylic dianhydride, 2,2'-diamino benzophenone tetracarboxylic dianhydride, 3,3'-diamino benzophenone tetracarboxylic dianhydride, etc.

This invention will be more clearly understood by reference to the following examples. These examples illustrate specific embodiments of the present invention and should not be construed to limit the invention in any way.

EXAMPLE 1

A sheet of 2 mil film of the polypyromellitimide of bis(4-aminophenyl) ether was placed in a vacuum evaporator which was pumped to a vacuum of $8 \times 10^{-6}$ millimeters of mercury. Zinc metal (20 mesh granular analytical reagent grade) was evaporated from a tantalum boat. The coating thickness of the zinc on the polyimide film was approximately 0.1 mil. The film was removed from the evaporator and cut into strips. These were sealed to one another by placing coated face to coated face and drawing a medium hot soldering iron over the outside of the film. The seal strength for a 1-inch width was in excess of 3,000 grams when tested on a Suter test machine. The bond obtained was also outstanding from the standpoint of durability at 400° C. in air.

EXAMPLE 2

Strips of zinc-coated polyimide film prepared as in Example 1 were rolled with coated face to coated face on a rolling mill having rolls 4 inches in diameter with 3½ inch wide roll surfaces. The roll speed was about 2 feet per minute and the bolt tension was set at 90 pounds. No heat was applied. The Suter peel strength of the resulting bonds was 590 grams for a ½ inch wide specimen. The Instron tensile seal strength was 17 pounds for a ½ inch wide specimen. This is a much stronger bond than obtained by cold rolling two pieces of galvanized steel together under the same conditions.

The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. A heat-sealable polyimide shaped article having on at least one surface a coating of zinc about 0.01 to 10 mils thick, said polyimide being characterized by a recurring unit having the following structural formula:

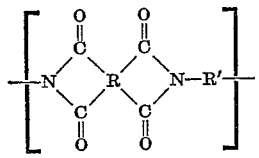

wherein R is a tetravalent radical containing at least six carbon atoms in a ring, said ring characterized by benzenoid unsaturation, the four carbonyl groups being attached to separate carbon atoms and each pair of carbonyl groups being attached to adjacent carbon atoms in the R radical; and wherein R' is a divalent benzenoid radical selected from the group consisting of

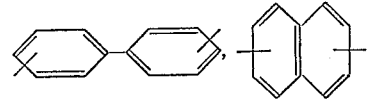

and

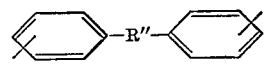

wherein R'' is selected from the group consisting of an alkylene chain having 1–3 carbon atoms,

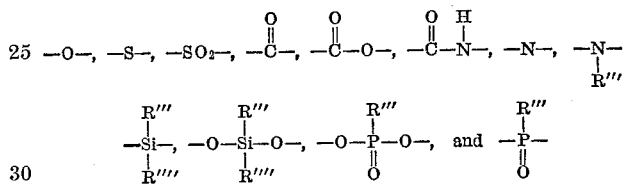

where R''' and R'''' are radicals having 1–6 carbon atoms and each is selected from the group consisting of alkyl and aryl.

2. A heat-sealable shaped article as in claim 1 wherein said article is in the form of a film.

3. A heat sealable shaped article as in claim 1 wherein said article is in the form of a fiber.

4. A heat-sealable shaped article as in claim 1 wherein R is derived from a dianhydride selected from the group consisting of pyromellitic dianhydride, 2,2-bis(3,4-dicarboxyphenyl) propane dianhydride, bis(3,4-dicarboxyphenyl) sulfone dianhydride and bis(3,4-dicarboxyphenyl) ether dianhydride.

5. A heat-sealable shaped article as in claim 1 wherein R' is derived from a diamine selected from the group consisting of benzidine, 4,4'-diamino diphenyl propane, 4,4'-diamino diphenyl methane, 4,4'-diamino diphenyl ether, 4,4'-diamino diphenyl sulfone, 4,4'-diamino diphenyl diethylsilane, 4,4'-diamino diphenyl phenylphosphine oxide, 4,4'-diamino diphenyl N-methylamine, 4,4'-diamino diphenyl sufide, 4,4'-diamino benzophenone, 3',4-diamino-benzanilide, and 3,4'-diamino phenyl benzoate.

References Cited

UNITED STATES PATENTS 2,881,425    4/1959    Gregory _____ 117—107 X

FOREIGN PATENTS 659,328    3/1963    Canada.

WILLIAM D. MARTIN, Primary Examiner.

J. E. MILLER, JR. Assistant Examiner.

U.S. Cl. X.R.

117—107, 138.8, 160